Oct. 25, 1966   H. P. BIRMINGHAM   3,280,625
PROJECTED OPTIMUM FLIGHT PATH LANDING ASSIST SYSTEM
Filed Jan. 30, 1964   3 Sheets-Sheet 1
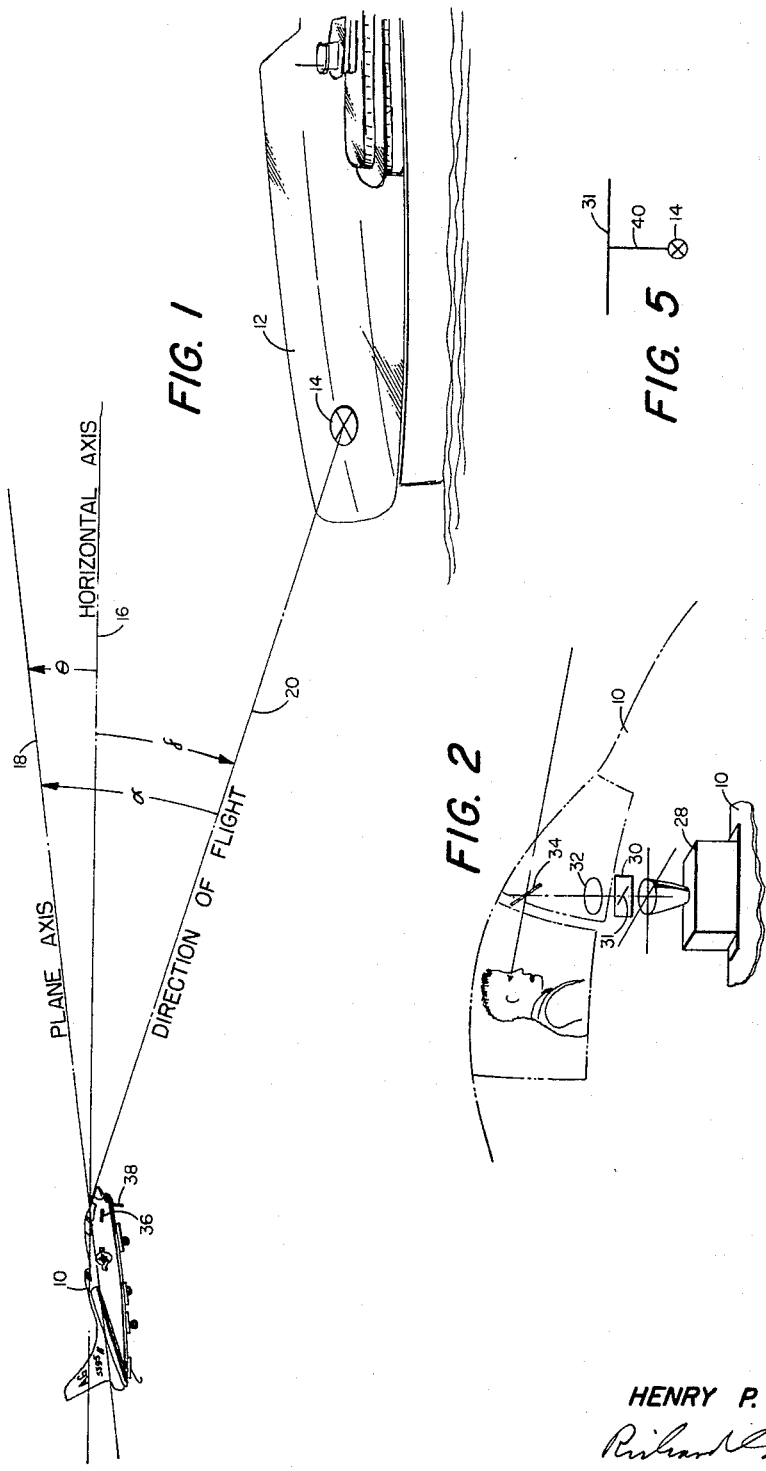
INVENTOR
HENRY P. BIRMINGHAM
BY
ATTORNEYS Oct. 25, 1966   H. P. BIRMINGHAM   3,280,625
PROJECTED OPTIMUM FLIGHT PATH LANDING ASSIST SYSTEM
Filed Jan. 30, 1964   3 Sheets-Sheet 2

INVENTOR
HENRY P. BIRMINGHAM
BY
ATTORNEYS

United States Patent Office 3,280,625
Patented Oct. 25, 1966

3,280,625
PROJECTED OPTIMUM FLIGHT PATH LANDING ASSIST SYSTEM
Henry P. Birmingham, Washington, D.C., assignor to the United States of America as represented by the Secretary of the Navy
Filed Jan. 30, 1964, Ser. No. 341,472
4 Claims. (Cl. 73—178)

The invention described herein may be manufactured and used by or for the Government of the United States of America for governmental purposes without the payment of any royalties thereon or therefor.

This invention relates to aircraft landing assist systems and more particularly to a system for projecting the optimum instantaneous flight path of the aircraft on the real world as an aid to the pilot during his landing approach.

The present invention constitutes a sophistication of and an improvement over the basic concept of landing approach systems embodied in applicant's copending application Serial Number 320,582 for a "Collimated Aircraft Landing Assist System," filed October 31, 1963.

Many comparatively complex systems utilizing radio beams, light beams, reflectors and simulators in the form of airborne computers, among others, have been suggested and employed for assisting pilots in landing their aircraft. Many of these complex directional systems operate on the principle of providing the pilot with an indication of his deviation from a prescribed flight path but do not necessarily tell him what that desired flight path is.

The landing approach assist system of the present invention accurately and continuously indicates to the pilot the actual flight path of his aircraft with respect to the touchdown point as opposed to his actual flight path in the air mass; by compensating the projected image, for motion of the air mass with respect to the touchdown point. So long as the pilot maintains the projected image on the intended point of touchdown at the landing zone, by adjusting his control surfaces and air speed, the aircraft will travel towards the touchdown point along the flight path as indicated by the projected image.

The landing assist system of this invention employs a pair of primary sensors mounted on the aircraft at right angles to each other for sensing the vertical and lateral components of the air stream traversing the aircraft. The electrical outputs of these detectors are compensated for movement of the air mass with respect to the touchdown point. The compensation is modified as a function of aircraft roll angle. Thus, an image is projected at optical infinity in the pilot's field of view which indicates his flight path with respect to the touchdown point.

An object of the present invention is the provision of an aircraft landing assist system of a comparatively simple and accurate nature.

A further object of this invention is to provide a projected image of the flight path of an aircraft during its landing approach.

Another object of the present invention is to provide a projected image along the flight path of an aircraft during a landing approach which includes correction factors for motion of the air mass with respect to the touchdown point.

These and other objects along with many of the attendant advantages of the present invention will be readily appreciated and better understood when the following detailed description is considered in conjunction with the accompanying drawings in which:

FIG. 1 is a diagrammatic view displaying the geometric relationship embodied in the present invention;

FIG. 2 is a diagrammatic view of the optical projection system of the present invention;

FIG. 5 is a graphic representation of the projected image while in the approach mode; and FIG. 6 is a graphic representation of the projected image of the FIG. 4 embodiment while in the landing mode.

Figure 3:
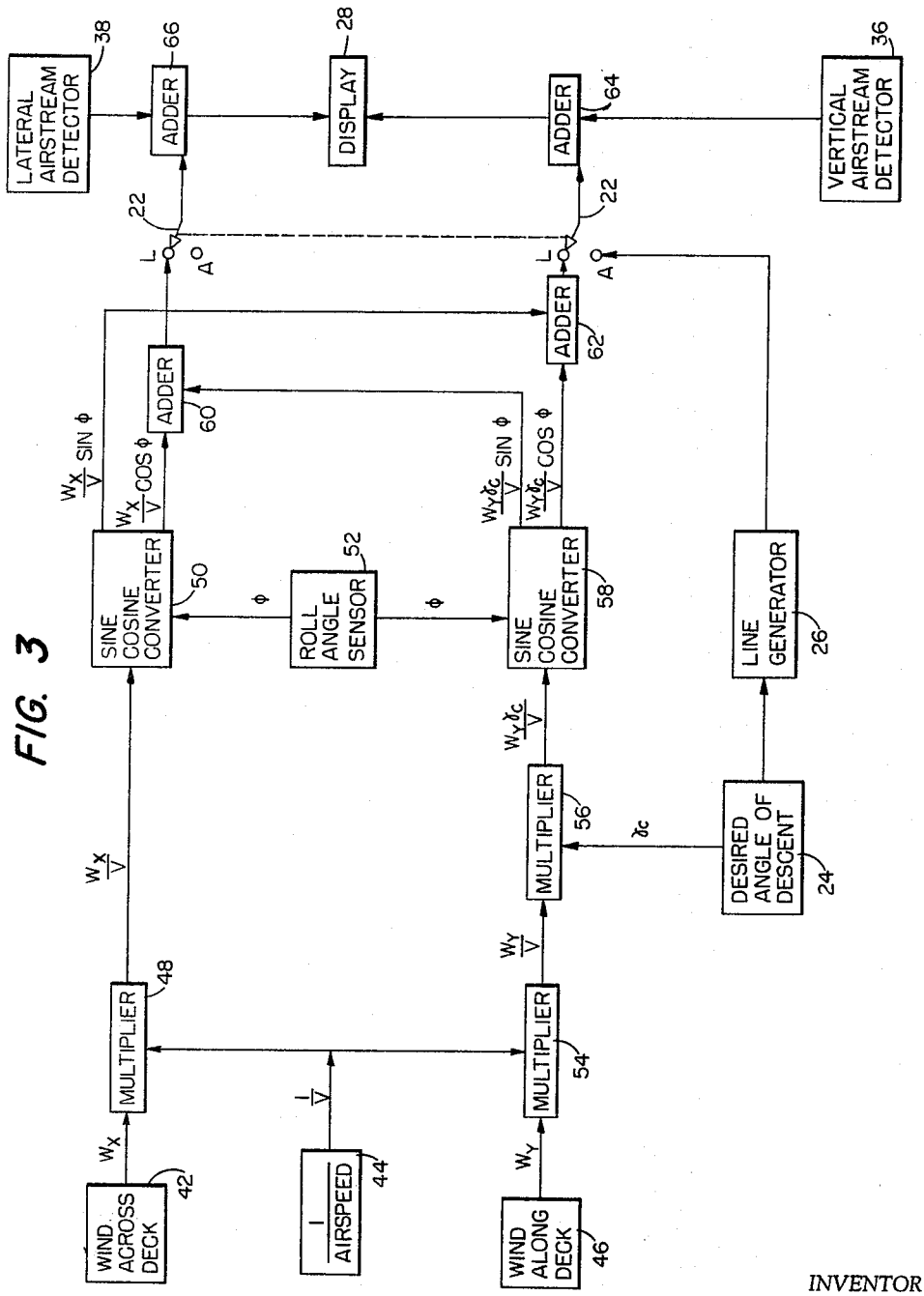
FIG. 3 is a schematic block diagram depicting the electronic system of the present invention.

Referring now in detail to the drawings wherein like reference characters represent like parts throughout the several views, there is shown in FIG. 1 an aircraft generally designated 10 and an aircraft carrier 12 having marking 14 on the landing deck thereof located at the optimum point of "touchdown" for a landing.

The landing approach system of this invention is based on a theory of air mass coordinates and involves a horizontal axis through the aircraft, designated 16, which is parallel to the earth's surface, the plane or aircraft axis, designated 18, which represents the longitudinal center line of the aircraft, and the direction of flight, designated 20, which represents the instantaneous direction of flight of the aircraft through the air mass as it approaches the point of touchdown. The angle between the direction of flight and the horizontal axis as represented by an arrow extending in a direction from the horizontal axis 16 to the direction of flight line 20 is designated $\gamma$ and defines the angle of descent for this aircraft. The angle between the direction of flight and the axis of the aircraft as represented by an arrow extending in a direction from the direction of flight line 20 to the plane axis line 18 is designated $\alpha$ and represents the angle of attack while the angle between the horizontal axis and the axis of the aircraft as represented by an arrow extending in a direction from the horizontal axis 16 to the plane axis line 18, designated $\theta$, represents the pitch of the aircraft. From the foregoing description it will be seen that, regardless of aircraft orientation and direction of motion, $\gamma = \theta - \alpha$. In determining the sign (positive or negative) for the angles in the formula to determine $\gamma$, with the arrows pointing in the directions as set forth above, an angle represented by an arrow pointing in an up direction is positive and an arrow pointing in a down direction is negative.

Figure 4:
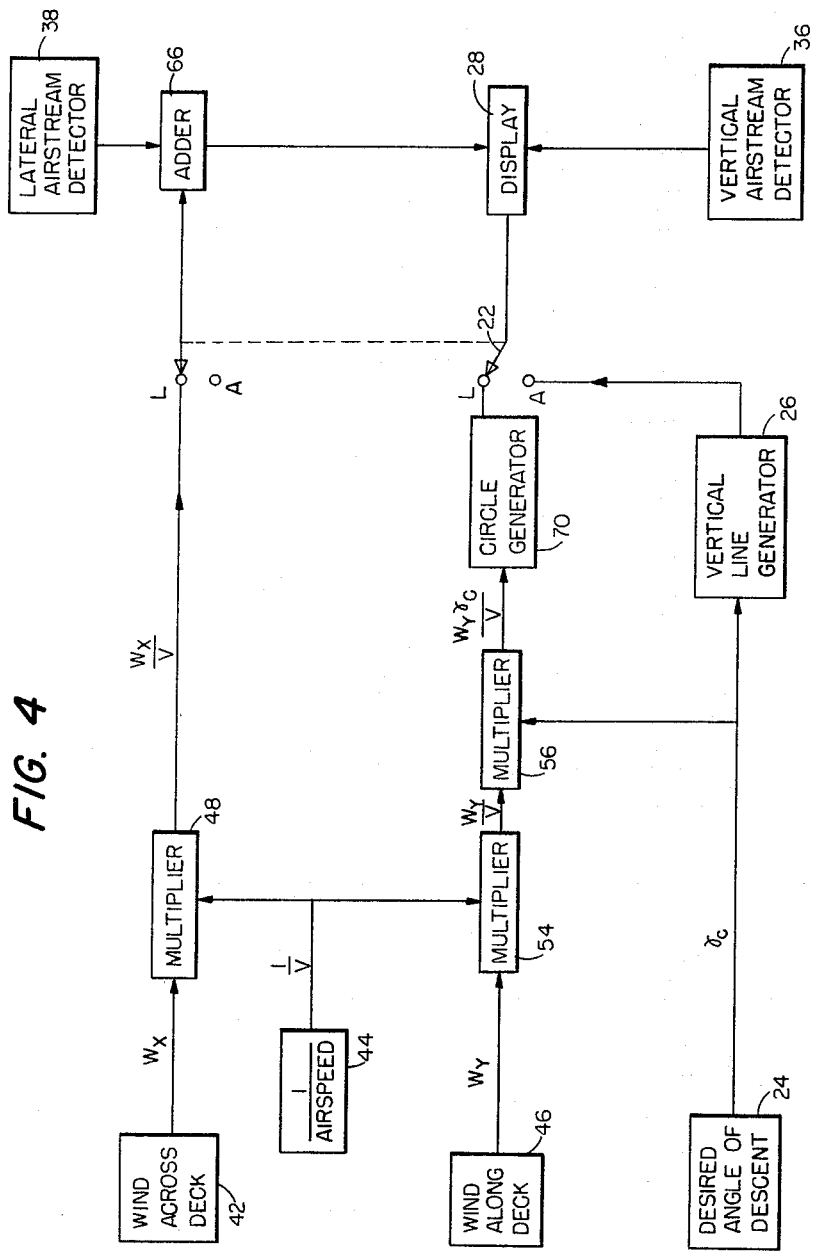
FIG. 4 is a schematic block diagram illustrating a simplified embodiment of the present invention.

The embodiments disclosed in FIGS. 3 and 4 differ from the invention of the above-referred-to, prior application in that they project the aircraft's flight path direction with respect to the touchdown point rather than with respect to the air mass. As a result, the projected image can be superimposed and maintained on a real world object and the aircraft will indeed eventually arrive at this object regardless of relative motion between the air mass and the object. This is not the case with respect to the instrument of the above-referred-to, prior application, however, if there occurs any relative motion between the air mass and the real world object as this instrument is restricted to air mass coordinates. The projection of the aircraft's flight path direction with respect to the desired point of touchdown as provided by the embodiments of FIGS. 3 and 4 is accomplished by compensating the projected image for such statically set and dynamically sensed variables as desired aircraft air speed, desired angle of descent, wind across the carrier deck, wind along the carrier deck and the aircraft roll angle.

The embodiment of FIG. 3 will be described first in order to show more clearly the function performed by the circle generator of the FIG. 4 embodiment. As the aircraft 10 approaches the carrier 12 switch 22 is thrown to the A or approach position placing the system in the approach mode. Just prior to the throwing of switch 22, the desired angle of descent, for example 4°, will have been set on instrument 24 which may be any one of a number of rheostat type signal producers which will produce an electrical signal in proportion to the setting thereof. The signal produced by the angle of descent selector 24 will be transmitted to line generator 26. The primary sensors of the system are vertical air stream detector 36 and lateral air stream detector 38. These air stream detectors may be of the type known commercially as a type S3 angle of attack system manufactured by Specialities, Inc. although any air stream sensor providing an equally instantaneous, proportional electrical output would be sufficient. Line generator 26 will provide a signal through switch 22, which is combined with the signal from air stream detector 36 and is fed to a cathode ray type display generator 28. The optical system for projecting the image produced on the display generator 28 includes a reticle plate 30, having a line 31 etched thereon, collimating lens 32 and combining glass 34 as shown in FIG. 2. Through this system any image displayed on display generator 28 will appear as an apparent image projected on the external scene in the pilot's field of view. Line generator 26 will respond to the desired angle of descent signal from instrument 24 to cause a line to be displayed on displaying generator 28 of such a length that the angle subtended at the pilot's eye by the projected line will be approximately the number of degrees set on instrument 24. This line will be positioned on display generator 28 as a function of the signal from detector 36.

The display generator 28 is fixed to the frame of the aircraft 10. Therefore, although detector 36 senses angle of attack $\alpha$, the projected image represents flight path angle $\gamma$, in accordance with the fixed relationship $$\gamma = \theta - \alpha$$

In the approach mode, air speed and pitch must be adjusted until projected line 31 (FIG. 5) is on the horizon as is the upper end of line 40. Holding these symbols on the horizon will cause the horizontal axis 16, and direction of flight 20 to be essentially colinear and will establish an optimum value of aircraft speed. As the aircraft approaches the point of touchdown 14 with the line 31 being maintained on the horizon the point of touchdown 14 will appear to move down line 40. When the touchdown point 14 reaches the lower end of line 40 the pilot will be at the correct distance from the touchdown point for the particular altitude at which he is flying to start his descent with the angle as previously set on instrument 24. He will then switch switch 22 to the L position to place the landing assist system in the landing mode.

The landing mode portion of the system includes instruments 42, 44 and 46 which are similar in construction to instrument 24. Information is obtained from the carrier as to the winds along and across its deck and this information is respectively set on instruments 46 and 42. The optimum landing speed for the particular aircraft and its particular weight load, for example 120 knots, is set on instrument 44. The rheostat type instruments will then cause an electrical signal proportional to wind settings to flow from instruments 42 and 46 while instrument 44's output signal will be a function of the reciprocal of the air speed set thereon. In the upper channel the reciprocal of the air speed $1/V$ is multiplied by wind across the deck $W_x$ by conventional multiplier 48 thus providing an input of $W_x/V$ to conventional sine-cosine converter 50. A conventional gyroscopic roll angle sensor 52 is employed to sense any lateral inclination of the aircraft from level flight and a signal proportional to the angle of that inclination $\phi$ is transmitted to sine-cosine converters 50 and 58. Sine-cosine converter 58 receives a signal proportional to $$\frac{W_y \gamma_c}{V}$$

which is provided by the signal $1/V$ from instrument 44 being multiplied by the wind along the deck $W_y$ in multiplier 54 and the output of multiplier 54 being multiplied by the desired angle of descent $\gamma_c$ by multiplier 56 thus providing a signal $$\frac{W_y \gamma_c}{V}$$

to sine-cosine converter 58. Sine-cosine converter 50 provides a pair of outputs $$\frac{W_x}{V} \sin \phi$$

representing the vertical component of the upper channel correction factors, and $$\frac{W_x}{V} \cos \phi$$

representing the lateral component of the upper channel correction factors. Sine-cosine converter 58 provides a pair of outputs $$\frac{W_y \gamma_c}{V} \sin \phi$$

representing the lateral component of the lower channel correction factors, and $$\frac{W_y \gamma_c}{V} \cos \phi$$

representing the vertical component of the lower channel correction factors. Both vertical components $$\frac{W_x}{V} \sin \phi$$

and $$\frac{W_y \gamma_c}{V} \cos \phi$$

are added by adder 62 and the result transmitted through switch 22 to adder 64 where it is added to the signal from vertical air stream detector 36 to provide the vertical or Y—Y component for positioning the dot generated by display generator 28. Similarly lateral components $$\frac{W_x}{V} \cos \phi$$

and $$\frac{W_y \gamma_c}{V} \sin \phi$$

are added by adder 60 and the output transmitted through switch 22 to adder 66 where it is added to the signal from lateral air stream detector 38 to provide the lateral or X—X component for positioning the dot generated by display generator 28.

Once the settable variables have been set on instruments 24, 42, 44 and 46 and switch 22 placed in the L position the pilot may ignore his instruments and, by adjusting the throttle and/or control stick of the aircraft to maintain the apparent image projected by the optical system on the desired point of touchdown 14 causes the aircraft to fly continually along a direct path from its present position to the point of touchdown.

The embodiment of FIG. 4 will perform the identical function as the embodiment of FIG. 3 but with considerably less electronic equipment required. With switch 22 in the A or approach position the display generated by display generator 28 will include vertical line 40 defining the desired angle of descent and line 31 as shown in FIG. 5. Both the top of line 40 and line 31 are positioned on the horizon in the approach mode. When the touchdown point reaches the lower end of line 40 switch 22 is thrown to the L position and the system is placed in the landing mode. The left hand portion of the FIG. 4 embodiment is identical with the left hand portion of the FIG. 3 embodiment to the point where a signal proportional to $W_x/V$ is transmitted from multiplier 48 and a signal proportional to $$\frac{W_y \gamma_c}{V}$$

is transmitted from multiplier 56.

In the FIG. 4 embodiment the signal $$\frac{W_y \gamma_c}{V}$$

is transmitted to circle generator 70 which provides a signal through switch 22 to display generator 28 causing a circle 72 to be generated on the display generator. The circle has a radius $r$ proportional to the signal $$\frac{W_y \gamma_c}{V}$$

with its center located at the same point as the upper end of line 40 occupied in the approach mode. The center of circle 72 will be positioned by a vertical (Y—Y) component transmitted to the display generator from vertical air stream detector 36 and by a lateral (X—X) component in the form of a signal transmitted from adder 66 which is the algebraic sum of the signal produced by lateral air stream detector 38 and the signal $W_x/V$ transmitted from multiplier 48 to adder 66.

Referring now to FIG. 6, which depicts the image projected in the pilot's field of view, the circle 72, or more particularly the radius $r$ of circle 72, represents the resultant of the vertical correction factors, wind along the deck $W_y$, the reciprocal of the air speed $1/V$ and desired angle of descent $\gamma_c$. The pilot by maintaining the bottom of circle 72 on the desired touchdown point 14 will continually fly along the projected flight path. Generating the circle essentially eliminates the requirement for the roll sensor and the sine-cosine converters. The effect of these elements on the vertical correction factor in the FIG. 3 embodiment is to cause the projected dot to move along the path which is described in the FIG. 4 embodiment by circle 72. With respect to the lateral correction factor the minor effect of aircraft roll angle in conjunction with wind-across-the-deck, also generally a very small factor, does not merit the inclusion in the lateral channel of the extra equipment as described in FIG. 3.

To utilize the embodiment of FIG. 4, the pilot continually maintains the marking 14 at the bottom of the circle, and therefore aircraft roll angle is essentially compensated for by the circle rather than by the sensor and function converters. Proper alignment of the aircraft with respect to angular roll as well as the maintenance of proper air speed is accomplished by maintaining line 31 in a position bisecting circle 72. One way in which the pilot may accomplish both of these functions without referring to his instrument panels is by maintaining the bottom of the circle on marking 14 through adjustment of the stick while maintaining the line 31 bisecting the cycle by adjusting the throttle. Complete control of the aircraft is thus maintained by the pilot while his attention is continually directed to the external scene including the desired point of touchdown. Maintaining the bottom of circle 72 on marking 14 and line 31 in a position bisecting circle 72 will cause the aircraft to continually progress along the indicated flight path towards the landing point for the conditions sensed by and set on the equipment.

As can be seen from the foregoing the present invention provides a simple and accurate landing approach aid which permits the pilot to observe his projected landing approach path without frequent referral to his instruments and further allows his attention to be directed at all times to the rapidly approaching point of touchdown while continually observing his direction of motion with respect to that point.

Obviously many modifications and variations of the present invention are possible in the light of the above teachings. It is therefore to be understood that within the scope of the appended claims the invention may be practiced otherwise than as specifically described.

What is claimed is:

1. A system for accurately and continuously indicating to a pilot the actual flight path of his aircraft through the air mass with respect to a selected touchdown point comprising:

image generating means, optical means associated with said image generating means for projecting a generated image as an apparent image at optical infinity in the pilot's field of view, first means for sensing the lateral component of the air stream traversing said aircraft and transmitting a proportional electrical signal, second means for sensing the vertical component of the air stream transversing said aircraft and transmitting a proportional electrical signal, a first variable signal generating means for generating a signal proportional to the lateral component of the winds transversing said touchdown pocket, a second variable signal generating means for generating a signal proportional to the reciprocal of the projected airspeed at the touchdown point, a third variable signal generating means for generating an electrical signal proportional to the longitudinal component of the winds traversing said touchdown point, a fourth variable signal generating means for generating a signal proportional to the desired angle of descent of said aircraft, first combining means connected to said first, second, third and fourth variable signal generating means for mathematically combining said signals into signals representing vertical and lateral correction factors, sensor means providing an output proportional to any roll angle assumed by said aircraft, and second combining means connected to said first combining means, said sensor means and the outputs of said first and second means whereby said signals representing said vertical and lateral correction factors are both modified by the signal from said roll angle sensor and the results thereof respectively algebraically added to the signals from said first and second means to position the generated image for projection along the desired flight path to the touchdown point.

2. A system for accurately and continuously indicating to a pilot the actual flight path of his aircraft through the air mass with respect to a selected touchdown point comprising:

an image generator for generating an image in response to electrical signals received thereby, optical means associated with said image generator for projecting said image as an apparent image at optical infinity in the pilot's field of view, a first air stream detector for sensing the lateral component of the air stream traversing said aircraft and transmitting an electrical signal proportional thereto, a second air stream detector for sensing the vertical component of the air stream transversing said aircraft and transmitting an electrical signal proportional thereto, a first electrical signal generating means for generating a signal proportional to the lateral component of the winds transversing said touchdown pocket, a second electrical signal generating means for generating a signal proportional to the reciprocal of the projected air speed of the aircraft at the touchdown point, a third electrical signal generating means for generating an electrical signal proportional to the longitudinal component of the winds traversing said touchdown point, a fourth electrical signal generating means for generating a signal proportional to the desired angle of descent of said aircraft, first electronic circuit means connected to said first, second, third and fourth electrical signal generating means for mathematically combining said signals into electrical signals representing vertical and lateral correction factors, a roll angle sensor for providing an electrical output proportional to any roll angle assumed by said aircraft, and second electronic circuit means connected to said first electronic circuit means, said roll angle sensor and the outputs of said first and second air stream detectors whereby said electrical signals representing said vertical and lateral correction factors are both modified by the signal from said roll angle sensor and the results thereof respectively algebraically added to the signals from said first and second air stream detectors to position the generated image for projection along the desired flight path to the touchdown point.

3. A system for accurately and continuously indicating the actual flight path of an aircraft through the air mass with respect to a proposed touchdown point comprising:

image generating means;

optical means for projecting an image generated by said image generating means, first, second, third and fourth signal generating means for generating a signal proportional to the lateral component of the winds traversing said touchdown point, the reciprocal of the air speed of the aircraft, the longitudinal component of the winds traversing said touchdown point, and the desired angle of descent of said aircraft to said touchdown point, respectively, first combining means connected to said second and third signal generating means for providing an output proportional to the product of their signals, second combining means connected to the output of said first combining means and said fourth signal generating means for providing an output proportional to the product of their signals, a circle generator connected between the output of said second combining means and said image generating means causing said image generating means to generate a circle thereon whose radius is proportional to the output signal of said second combining means, a third combining means connected to said first and second signal generator for providing an output proportional to the product of the signals from said first and second signal generators, and first and second air stream detectors for respectively sensing the lateral and vertical components of the airstream traversing said aircraft and providing output signals proportional to said sensed components to said image generator for laterally and vertically positioning said circle, the lateral positioning of said circle being further modified by the addition of the output of said third combining means to the signal from said first air stream detector, whereby by maintaining the bottom of the image of said generated circle on said touchdown point said pilot will fly an accurate course thereto.

4. A system for accurately and continuously indicating the actual flight path of an aircraft through the air mass with respect to a proposed touchdown point comprising:

image generating means, optical means for projecting an image generated by said image generating means, first signal generating means for generating a signal proportional to the lateral component of the winds traversing said touchdown point, second signal generating means for generating a signal proportional to the reciprocal of the air speed of the aircraft, third signal generating means for generating a signal proportional to the longitudinal component of the winds traversing said touchdown point, fourth signal generating means for generating a signal proportional to the desired angle of descent of said aircraft to said touchdown point, first multiplier means connected to said second and third signal generating means for providing an output proportional to the product of their signals, second multiplier means connected to the ouput of said first multiplier means and said fourth signal generating means for providing an output proportional to the product of their signals, a circle generator connected between the output of said second multiplier means and said image generating means causing said image generating means to generate a circle thereon whose radius is proportional to the output signal of said second multiplier, a third multiplier connected to said first and second signal generators for providing an output proportional to the product of the signals from said first and second signal generators, and first and second air stream detectors for respectively sensing the lateral and vertical components of the air stream traversing said aircraft and providing electrical signals proportional to said sensed components to said image generator for laterally and vertically positioning said circle, the lateral positioning of said circle being further modified by the algebraic addition of the ouput of said third multiplier to the signal from said first air stream detector.

References Cited by the Examiner

UNITED STATES PATENTS

| | | | |
|---|---|---|---|
| 2,426,184 | 8/1947 | Deloraine et al. | 340—27 |
| 2,830,291 | 4/1958 | Hecht et al. | 73—178 |
| 2,887,927 | 5/1959 | Newton | 33—46.5 |
| 3,005,185 | 10/1961 | Cumming et al. | 73—178 |

LOUIS R. PRINCE, *Primary Examiner.*

DONN McGIEHAN, *Assistant Examiner.*